Aug. 26, 1969     P. H. WINTER     3,463,263
AIR CUSHION VEHICLES WITH HIGH PRESSURE PROPULSION
AND LOW PRESSURE CUSHION CENTRIFUGAL PUMPS
Filed Jan. 5, 1967     2 Sheets-Sheet 1

*INVENTOR.*
PETER H. WINTER
BY
ATTORNEYS

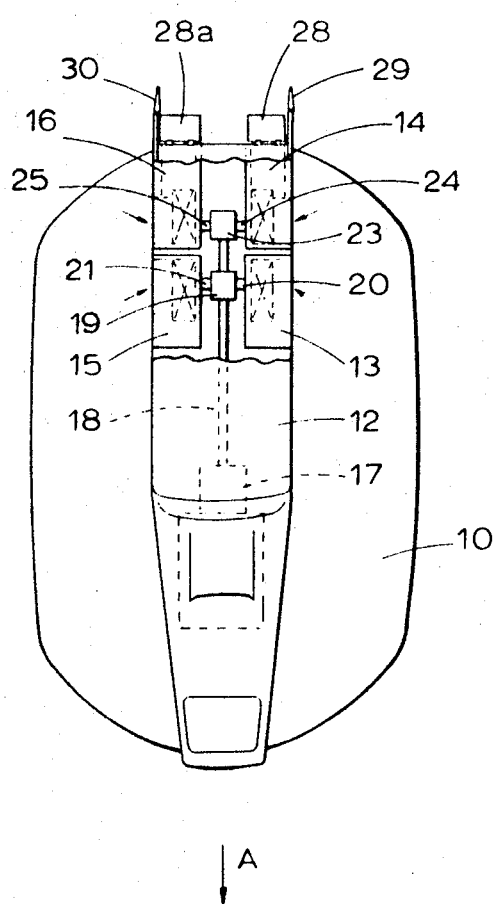

United States Patent Office 3,463,263
Patented Aug. 26, 1969

3,463,263
AIR CUSHION VEHICLES WITH HIGH PRESSURE PROPULSION AND LOW PRESSURE CUSHION CENTRIFUGAL PUMPS
Peter Heron Winter, Cowes, Isle of Wight, England, assignor to Britten-Norman Limited, St. Helens, Isle of Wight, England, a corporation of the United Kingdom
Filed Jan. 5, 1967, Ser. No. 607,479
Claims priority, application Great Britain, Jan. 6, 1966, 698/66
Int. Cl. B60v 1/04
U.S. Cl. 180—117    2 Claims

ABSTRACT OF THE DISCLOSURE

An air cushion vehicle having low pressure air compression means, preferably centrifugal lift fans, to provide an air cushion, and independently driven high pressure air compression means, preferably centrifugal propulsion fans generating pressure of the order of twice that of the lift fans to provide pressure air for propulsion and control of the vehicle, and means to bleed the high pressure air supply to supplement the low pressure air supply to the air cushion if desired.

---

Figure 1:
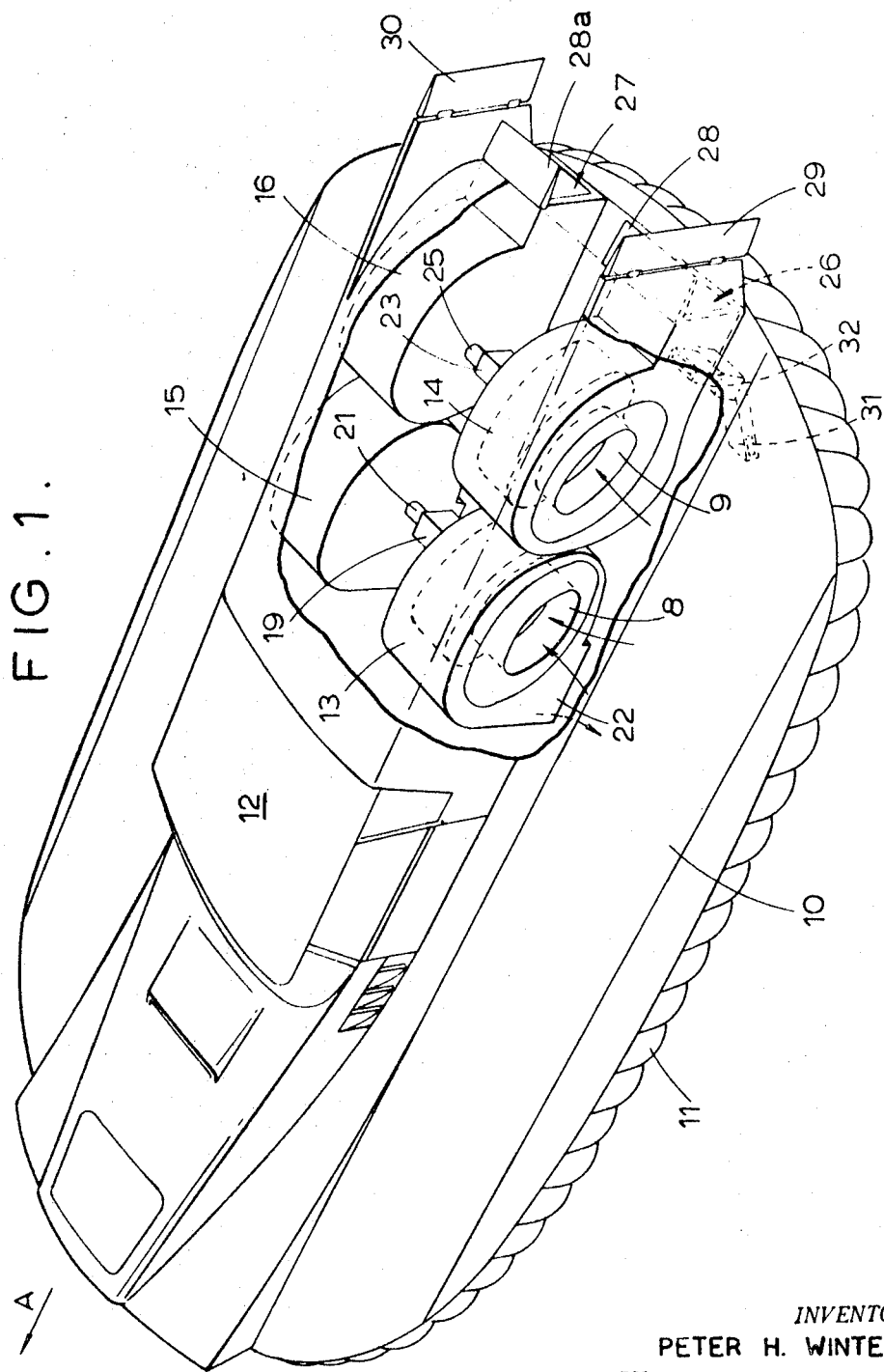

This invention relates to improvements in air cushion vehicles. It is an object of the invention to provide more efficient arrangements for the supply of air to the services required, and to improve the control and propulsion of the vehicle.

It is already known to provide propulsion ducts and an air cushion served by a common source of pressure air, thus obviating the need for propulsion airscrews. The requirements of the lift air system and the propulsion air system are, however, generally different.

According to the invention an air cushion vehicle comprises at least one low pressure air compression means arranged to provide pressure air for an air cushion, at least one independently driven high pressure air compression means arranged to provide pressure air for propulsion and control of the vehicle, and means to bleed the high pressure air supply to supplement the low pressure air supply to the air cushion if desired.

Conveniently the air compression means may be constituted by centrifugal fans, and conveniently the propulsion fan pressure is of the order of twice that of the lift fan.

One example of the invention will be described with reference to the accompanying drawings, in which:

FIGURE 1 is a perspective three-quarter rear view of an air cushion vehicle, and FIGURE 2 is a diagrammatic plan of the vehicle, to a smaller scale.

Referring to the drawings, the vehicle has a hull 10, a skirt 11, and a cabin 12. The direction of forward motion is indicated by an arrow A.

Four centrifugal fans 13, 14, 15, 16 are arranged in two banks, one on each side of a power unit 17, and air is taken in through inlets such as 8, 9 on the outboard sides of the fans. The forward fan 13 or 15 of each bank is driven from the power unit 17 through a propeller shaft 18, gearbox 19, and drive shaft 20 or 21 to serve as a low pressure fan, and its output such as 22 is ducted to a plenum within the skirt 11 to provide an air cushion. The rear fan 14 or 16 of the bank is arranged as a high pressure fan independently driven from the power unit 17 through the propeller shaft 18, gearbox 19, gearbox 23, and drive shaft 24 or 25, and having an outlet 26 or 27 rearwardly directed to provide thrust for the forward propulsion of the vehicle. At the outlets 26 and 27 there are arranged horizontal control surfaces 28, 28a and vertical control surfaces 29, 30 providing means for deflecting the issuing stream of pressure air for control of the vehicle. Movement of the vertical control surfaces 29, 30 causes the streams to be deflected laterally to provide directional control. Movement of the horizontal control surfaces 28, 28a causes the streams to be deflected up or down, providing pitch moments which may be used for controlling the vehicle or adjusting its trim. There may also be provided a vane or shutter to close each outlet and cause the air to flow into an additional duct with a forwardly directed outlet, thus providing reverse thrust.

A bleed such as indicated at 31 from any suitable points in the outlet ducting of the high pressure fans 14, 16 is arranged to deliver high pressure air, under control of the pilot, e.g., by a valve 32, to the plenum to supplement the low pressure air provided by the low pressure fans 13 and 15.

The low pressure fans 13, 15 may be driven through common transmission or may be driven independently of each other, as required, by suitable arrangement of the gearbox 19. Conveniently the high pressure fans 14, 16 are driven independently of each other so that, for example, their outputs may be regulated by use of a rudder bar to provide directional control.

I claim:

1. An air cushion vehicle for travelling over a surface which is at least partly supported above that surface by a cushion of pressurized air formed and contained beneath the vehicle comprising, in combination, a plenum chamber for containing said cushion, means communicating with said plenum chamber and providing low pressure air for said air cushion, means for providing high pressure air for propulsion and control of the vehicle, driving means for driving said low pressure and said high pressure means independently of one another, and means in said high pressure air providing means and in direct communication with said plenum chamber to selectively bleed high pressure air into said plenum chamber to supplement the low pressure air therein, and wherein the combination of said low pressure and high pressure means comprise a plurality of centrifugal fans disposed in a tandem relationship with respect to one another with the outlet of said low pressure means opening into said plenum chamber and the outlet of said high pressure means directed, at least in part, longitudinally of said vehicle.

2. An air cushion vehicle as defined in claim 1, wherein the axis of rotation of each centrifugal fan is disposed laterally across the vehicle, and wherein each of said low and high pressure means further comprises a plurality of centrifugal fans disposed in tandem relationship with respect to one another, said low pressure centrifugal fans having axes of rotation disposed coaxially and laterally across the vehicle, and said high pressure centrifugal fans having axes of rotation disposed coaxially and laterally across the vehicle.

References Cited

UNITED STATES PATENTS

| 3,174,572 | 3/1965 | Eggington et al. | 180—118 |
| 3,208,543 | 9/1965 | Crowley | 180—121 |
| 3,185,239 | 5/1965 | Cockerell | 180—130 |
| 3,211,124 | 10/1965 | Mantle | 180—116 |

A. HARRY LEVY, Primary Examiner